United States Patent

Watson et al.

[11] Patent Number: 6,164,084
[45] Date of Patent: Dec. 26, 2000

[54] MOTOR COOLING

[75] Inventors: Stephen Richard Watson, South Petherton; James Dudley Brinsden, Yeovil; Malcolm Philip Wilson, Crewkerne; Richard Grant Hunt, Yeovil, all of United Kingdom

[73] Assignee: Normalair-Garrett (Holdings) Ltd., Yeovil, United Kingdom

[21] Appl. No.: 09/173,302

[22] Filed: Oct. 15, 1998

[30] Foreign Application Priority Data

Oct. 16, 1997 [GB] United Kingdom .................. 9721850

[51] Int. Cl.[7] .............................. F25D 9/00; H02K 9/00; H02K 9/06
[52] U.S. Cl. ...................... 62/402; 310/60 A; 310/60 R
[58] Field of Search ................ 62/401, 402; 310/58, 310/60 A, 60 R

[56] References Cited

U.S. PATENT DOCUMENTS

| 4,219,746 | 8/1980 | Butler, III | 310/61 |
| 4,295,518 | 10/1981 | Rannenberg | 165/2 |
| 5,113,670 | 5/1992 | McAuliffe et al. | 62/402 |
| 5,703,421 | 12/1997 | Durkin | 310/61 |
| 5,747,900 | 5/1998 | Nakamura et al. | 310/58 |

FOREIGN PATENT DOCUMENTS

| 0297691 | 1/1989 | European Pat. Off. . |
| 0 392 243 | 10/1990 | European Pat. Off. . |
| 40 32 944 | 6/1991 | Germany . |

OTHER PUBLICATIONS

Patent Abstract of Japan publication No. 06261510; publication date Sep. 16, 1994; Applicant Nissan Motor Co Ltd.; title "Reluctance Motor".

Patent Abstract of Japan publication No. 01069239; publication date Mar. 15, 1989; Applicant Toshiba Corp.; title "Rotary Electric Machine For Vehicle".

Patent Abstract of Japan publication No. 08324231; publication date Oct. 10, 1996; Applicant Suzuki Motor Corp; title "Cooling System Of Air–Conditioning Motor Or Electric Vehicle".

*Primary Examiner*—William Doerrler
*Attorney, Agent, or Firm*—Marshall, O'Toole, Gerstein, Murray & Borun

[57] ABSTRACT

An electric motor assembly e.g. for an air cycle air conditioning apparatus comprises stator windings and a rotating member mounted for rotation about a motor axis and wherein, the stator windings comprise therethrough at least one axially extending passage, and there being means to connect the passage to a source of cooling gas, whereby as the cooling gas flows along the axially extending passage the motor assembly is cooled.

8 Claims, 2 Drawing Sheets

MOTOR COOLING

BACKGROUND OF THE INVENTION

This invention relates to an electric motor assembly and more particularly but not exclusively to such an assembly for use in an air conditioning apparatus e.g. of the air cycle kind in which load air is cooled by system air which is cooled by an expansion turbine or other air expansion member of the apparatus.

In such an apparatus the motor will generate heat in operation which needs to be removed from the motor. It is known to establish a flow of cooled system air over the motor but particularly where the motor comprises e.g. a switched reluctance motor or a permanent magnet DC motor or a high speed induction motor, in which a rotating member of the motor rotates at high speed, the cooling effect of such system air is inadequate.

DESCRIPTION OF THE PRIOR ART

It has been proposed in U.S. Pat. No. 5,703,421 to provide radially extending passages through stator windings to allow for the venting of spent cooling fluid from a space between the rotor and stator. Although such passages may permit of some winding cooling, the effect is somewhat limited.

SUMMARY OF THE INVENTION

According to a first aspect of the invention we provide an electric motor assembly comprising stator windings and a rotating member mounted for rotation about a motor axis, characterised in that, the stator windings comprise therethrough at least one axially extending passage, and there being means to connect the passage to a source of cooling gas, whereby as the cooling gas flows along the axially extending passage, the stator windings of the motor assembly are cooled.

Thus additional cooling of the motor assembly may be achieved, and the cooling gas will remove heat from a position immediately close to where the heat primarily is generated i.e. in the stator windings.

In one construction conveniently the axially extending passage communicates with a manifold from which the cooling gas passes into the axially extending passage, and the passage may also communicate at a position axially remote from the manifold, with an exhaust passage, the cooling gas in use flowing from the manifold, axially along the passage through the stator windings and into the exhaust passage.

For example, the stator windings may be provided within a casing, the manifold being provided towards one end of the casing and the axially extending passage communicating with the exhaust passage towards an opposite end of the casing. Thus conveniently means may be provided for establishing a flow of primary cooling air over the casing, the cooling gas through the passage of the stator windings comprising a secondary cooling flow.

Typically the primary cooling air will be ambient air at a reduced pressure compared with the source of the secondary cooling gas and so to establish the secondary cooling gas flow, the exhaust passage may open into the lower pressure primary cooling air which flows or has flowed over the casing.

Where the source of cooling gas is ambient air, and a manifold is provided, the ambient air may be cooled prior to flowing into the manifold.

Alternatively though the primary cooling air may be at a higher pressure than ambient air in which case the source of cooling gas may comprise primary cooling air which flows or has flowed over the casing and the exhaust passage communicates with the lower pressure ambient air.

Although the passage or passages through the stator windings may be of any desired configuration, the or each axially extending passage through the stator windings preferably comprises an generally axially extending gap between a pair of adjacent winding sections.

The rotating member may comprise a shaft which is journalled in bearings, and if desired the cooling gas prior to and/or subsequent to flowing along the axially extending passage or passages, may cool the bearings. This is particularly beneficial where the rotating member rotates at high speed when much heat can be generated in the bearings.

The rotating member of the motor assembly may comprise a shaft which carries an air compressor member and/or an air expansion member whereby the motor assembly comprises a motive means of an air conditioning apparatus.

Although the invention may be applied to any suitable motor assembly type, the invention has particularly been developed for use where the motor assembly is of the switched reluctance or other type in which the rotating member in use is rotated at high speed by which we mean typically at least 10,000 revolutions per minute, and more typically up to 40,000 revolutions per minute or more.

According to a second aspect of the invention we provide an air conditioning apparatus comprising a motor assembly according to the first aspect of the invention.

The apparatus may comprise a heat exchanger in which cooled system air removes heat from load air, the system air providing a flow of primary cooling air to flow over a casing of, and thus cool, the motor assembly, and the cooled system air may be at a pressure less than ambient air pressure, the cooling gas flow through the axially extending passage through the stator windings communicating with the cooled system air and comprising ambient air whereby the cooling gas is drawn into the motor assembly and into the lower pressure cooled air.

The invention will now be described with reference to the accompanying drawings in which

DESCRIPTION OF THE PREFERRED EMBODIMENTS

Figure 1:
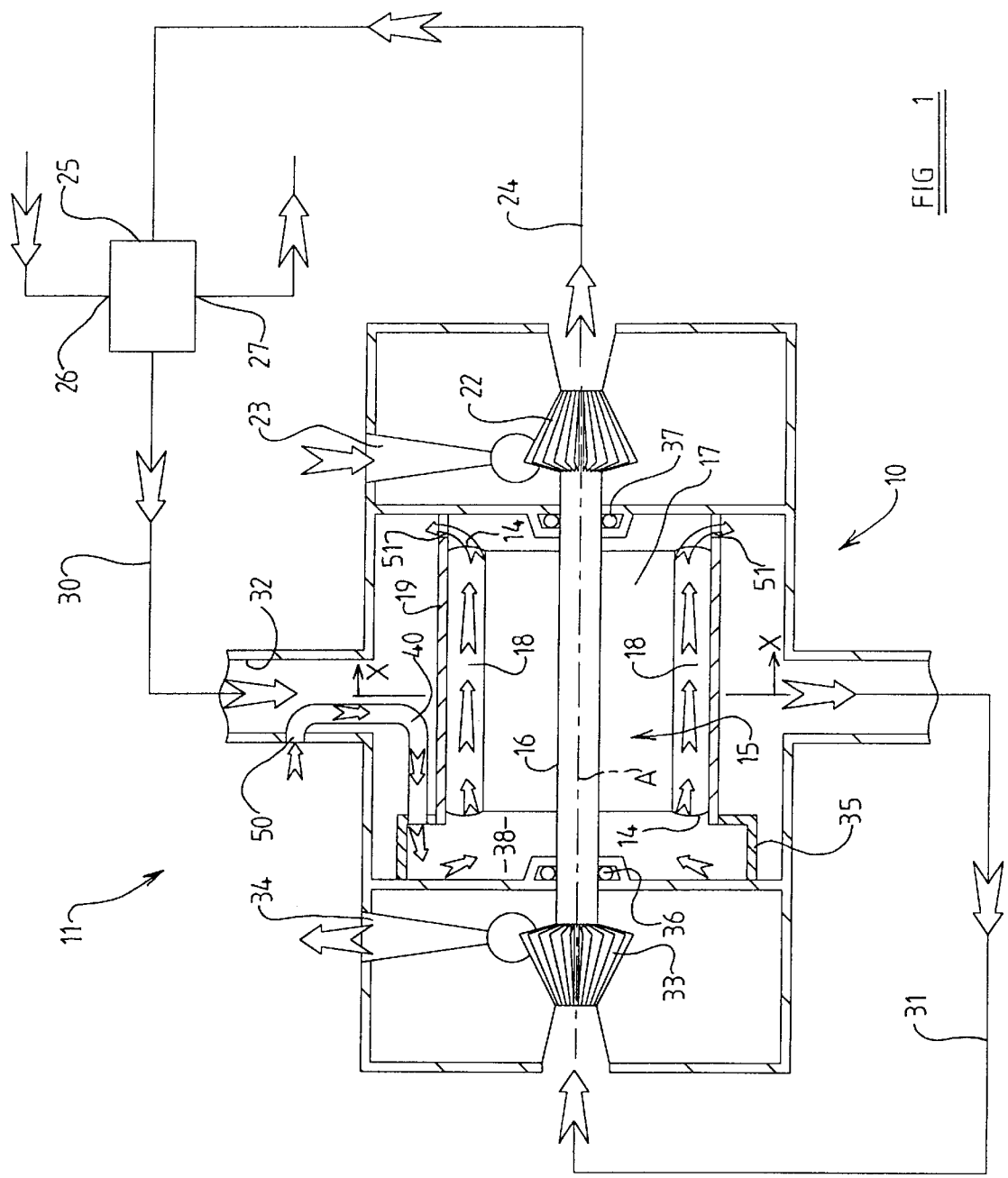
FIG. 1 is a illustrative cross sectional view along the line YY of FIG. 2, of an electric motor assembly in accordance with the invention.

Referring to the drawings, an electric motor assembly 10 comprises a motive means of an air cycle air conditioning system 11.

The motor assembly 10 is of the switched reluctance kind having no permanent magnet, but stator windings indicated at 14 including stator poles P arranged generally cylindrically, and a rotating member 15 comprising a shaft 16 carrying laminations 17, which shaft 16 rotates about a rotor axis A.

The operation of switched reluctance motors is not described more fully herein but the invention is concerned with a means for cooling the electric motor assembly 10 be it of the switched reluctance kind as illustrated, or of an alternative kind.

The stator windings 14 are provided in circumferentially arranged sections, with there being axially extending gaps 18 between the sections which, as will hereafter be described, provide passages for cooling gas.

Although the gaps 18 open to the rotating member 15 and the laminations 17 of the rotating member 15 may have cut-outs C as shown, due to the speed at which the rotating member 18 rotates, there is negligible transfer of cooling gas from the gaps 18 into the cut outs C. In any event, the ends of the laminations 17 are closed by closure discs D.

The motor assembly 10 comprises a casing 19 which contains the windings 14 and rotating member 15 axially within the casing 19.

At one end of the shaft 16 of the rotating member 15 there is provided an expansion turbine wheel 22 which rotates with the shaft 16. Ambient air is drawn into the expansion turbine 22 via an ambient air inlet 23, is expanded and thus cooled by the turbine wheel 22, and then passes along a passage 24 of the air conditioning apparatus 11 to a heat exchanger 25 to which hot load air is delivered at an inlet 26. As the expanded cooled air passes through the heat exchanger 25, heat is thus removed from the load air, and the cooled load air is returned to an air conditioned environment (not shown) such as a train carriage compartment via an outlet 27 from the heat exchanger 25.

Figure 2:
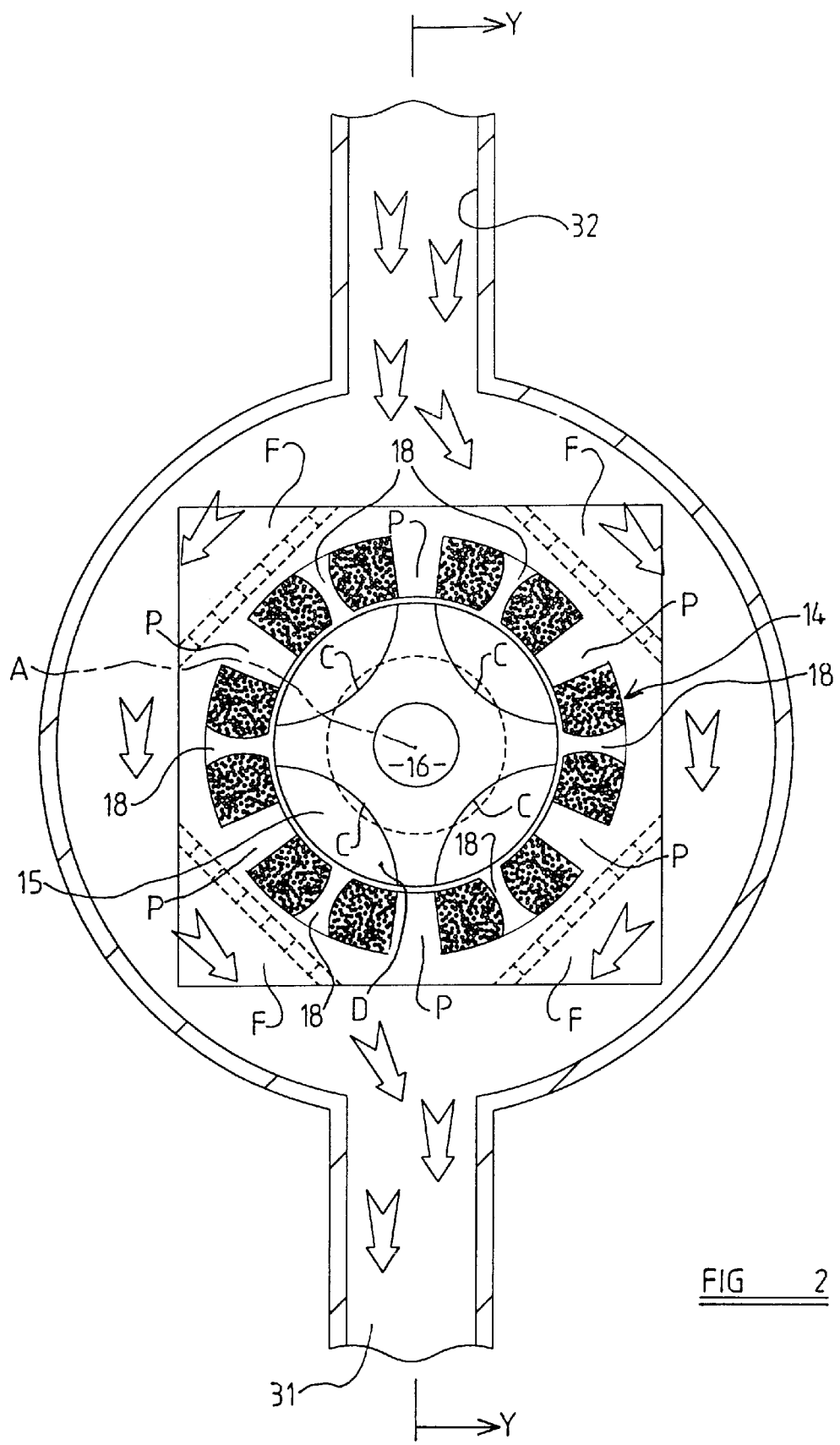
FIG. 2 is an illustrative cross section along the line XX of FIG. 1.

The warmed system air leaves the heat exchanger 25 and passes along a conduit 30 an inlet 32 of the motor assembly 10. It can be seen particularly from FIG. 2 that the system air is then constrained to flow around the casing 19 of the motor assembly 10 before passing to a further conduit 31. The system air 30 from conduit 30 will be of a relatively low pressure still, but will be warmer than the system air entering the heat exchanger 25. However, the system air will still be cooler than the casing 19 of the motor assembly 10 and thus as it flows round the casing 19, the system air will remove heat from the motor assembly 10. Fins F are provided to enhance heat exchange between the casing 19 and system air.

The thus further warmed but still low pressure system air in conduit 31 is fed to a compressor wheel 33 which is also carried on shaft 16 which compressor wheel 33 returns the system air to ambient pressure at least, before exhausting the system air through an exhaust outlet 34 to ambient.

At one axial end of the casing 19, which in this example is the end closet to the compressor wheel 33, there is provided a manifold 35 in which bearings 36 in which the shaft 16 is journalled at its end towards the compressor wheel 33, are positioned. At an opposite end of the casing 19, adjacent to the turbine wheel 22, further bearings 37 for shaft 15 are provided. Thus the bearings 36 are located adjacent to a space 38 within the manifold 35, the space 38 communicating with the axially extending gaps 18 between the sections of stator windings 14 of the motor assembly 10.

A conduit 40 is provided which communicates at one end with the space 38 of the manifold 35, and at an opposite end with an ambient air inlet 50.

The conduit 40 extends through system air inlet 32 to the motor assembly 10.

At an opposite end of the casing 19, there are provided a plurality of openings 51 into the system air flow around the casing 19.

As the system air flowing around the casing 19 is a relatively low pressure, it will be appreciated that in use ambient air will be drawn into inlet 50, pass along the conduit 40 into the space 38 of the manifold 35, and be drawn along the axially extending gaps 18 before passing via the openings 51 into the lower pressure system air flow. Thus the ambient air acts as a cooling gas.

This flow of air has two effects. First, the air will cool the windings 14 of the motor assembly 10 as it flows along the gaps 18, and secondly, because the bearings 36 in which shaft 16 is journalled are located in the space 38 into which the air flows from conduit 40, the bearings 32 too will be cooled by the flowing air. The bearings 37 may also be subjected to a cooling effect as the air flows past the bearings 37 into the openings 51.

Furthermore as the system air flowing in the inlet 32 to the motor assembly 10 may be of lower temperature than ambient, the ambient air whilst flowing in conduit 40 will be cooled by the system air prior to entering space 38 of the motor assembly 10.

Thus the motor assembly 10 is cooled by a flow of primary cooling system air passing over the casing 19 (which may be finned or ribbed to promote heat transfer), which air will at least be of lower temperature than the casing 19, and by a secondary flow of cooling air/gas from the ambient air inlet 50.

It will be appreciated that the introduction of the ambient air 50 into the system air flow will have two further effects. First this may increase the pressure of the system air flowing around casing 19, and secondly may increase the temperature of the system air flowing. This will impose an increased load on the motor assembly 10 and the compressor wheel 33 will thus need to be slightly larger than otherwise would be required, in order to accommodate that extra load. The extra load will of course also impose a greater heating effect within the motor assembly 10 and hence a balance needs to be obtained between the decrease in efficiency arising out of the increase in pressure and temperature of the system air, flowing over casing 19 and the increase in operating efficiency and bearing life etc. of the motor assembly 10 by virtue by it being cooled.

Many modifications may be made without departing from the scope of the invention. Most particularly, although the invention has been described with reference to a switched reluctance type motor, the invention may be applied to any other motor in which there are stator windings through which passages for the flow of cooling air or an other cooling gas may be established.

If desired, to control the amount of cooling gas drawn into the ambient air inlet 50, a valve may be provided, the flow through which valve may be adjusted in response to the amount of cooling required within the motor assembly 10.

Although as described, the motor assembly 10 carries on the shaft 16 of the rotating member 15, a compressor wheel 33 and a turbine wheel 22, other arrangements by which the motor assembly 10 provides a motive force to at least expand air and/or compress air as desired, may be provided.

Although it is preferred for the motor assembly 10 to be cooled by a primary flow of system air from the load heat exchanger 25 over a casing 19 thereof, any other primary motor cooling means could be provided. The arrangement described has the advantage though that no auxiliary pump or the like is required for providing cooling air gas or other fluid to the motor assembly 10, air flow occurring solely as a result of the operating conditions of the motor assembly 10.

Instead of the passages for cooling gas through the stator winding 14 of the motor assembly 10 comprising axially extending gaps 18 or slits, any other means for allowing an axial flow of cooling gas through at least one axially extending passage of the windings 14, may be provided.

The invention may be applied to an electric motor assembly for another kind of air conditioning assembly but preferably to an air cycle air conditioning assembly. In another arrangement, the system air may be of high pressure within the inlet 32 to the assembly 10 in which case the exhaust outlet openings 51 from the casing 19 may be vented to ambient rather than to the system air flow, such that the higher pressure system air is drawn through the passage or passages through the stator windings 14 and exhausted to ambient, although again this will result in a slight loss of opening efficiency of the motor assembly 10 to be balanced against the increase in efficiency of the motor 10 being cooled.

The invention may even be applied to a system in which the system air is heated air which has previously delivered heat to load air for use in the air conditioned environment. The hot system air will of course need to be cooler than the motor assembly 10 to provide any cooling effect in such circumstances.

What is claimed is:

1. An electric motor assembly comprising stator windings and a rotating member mounted for rotation about a motor axis, the stator windings comprising therethrough at least one axially extending passage extending from a manifold at one end of the stator windings to an exhaust passage at an opposite end of the stator windings, and there being means to connect the manifold to a source of cooling gas, whereby in use cooling gas flows within the stator windings along the axially extending passage, from the one end to the opposite end, thereby cooling the stator windings of the motor assembly, the axially extending passage communication at a position axially remote from the manifold, with the exhaust passage and the stator windings being provided within a casing, the manifold being provided towards one end of the casing and the axially extending passage communicating with the exhaust passage towards an opposite end of the casing, and there being means for establishing a flow of primary cooling air over the casing, the cooling gas through the passage of the stator windings comprising a secondary cooling flow.

2. An assembly according to claim 1 wherein the source of cooling gas is ambient air and the exhaust passage opens into lower pressure primary cooling air which flows or has flowed over the casing.

3. An assembly according to claim 2 wherein the ambient air is cooled prior to flowing into the manifold.

4. An assembly according to claim 1 wherein the axially extending passage through the stator windings comprises a generally axially extending gap between a pair of adjacent windings sections.

5. An assembly according to claim 1 wherein the rotating member comprises a shaft which is journalled in bearings, the cooling gas prior to and/or subsequent to flowing along the axially extending passages, cooling the bearings.

6. An assembly according to claim 1 wherein a rotatable shaft of the motor carries an air compressor member and/or an air expansion member whereby the motor assembly comprises a motive means of an air conditioning apparatus.

7. An assembly according to claim 6 wherein the motor assembly is of the switched reluctance type in which the rotating member in use is rotated at high speed.

8. An air conditioning apparatus having a motor assembly comprising stator windings and a rotating member mounted for rotation about a motor axis, the stator windings comprising therethrough at least one axially extending passage, and there being means to connect the passage to a source of cooling gas, whereby as the cooling gas flows along the axially extending passage, the stator windings of the motor assembly are cooled, wherein a heat exchanger is provided in which cooled system air removes heat from load air, the system air providing a flow of primary cooling air to flow over a casing of, and thus cool, the motor assembly and the cooled system air is at a pressure less than ambient air pressure, the cooling gas flow through the axially extending passage communicating with the cooled system air and comprising ambient air whereby the cooling gas is drawn into the motor assembly and into the lower pressure cooling air through the stator windings.

\* \* \* \* \*

UNITED STATES PATENT AND TRADEMARK OFFICE
CERTIFICATE OF CORRECTION

PATENT NO. : 6,164,084
DATED : December 26, 2000
INVENTOR(S) : Stephen Richard Watson, et al.

It is certified that error appears in the above-identified patent and that said Letters Patent is hereby corrected as shown below:

<u>Column 5,</u>
Line 31, delete "communication" and insert -- communicating --

Signed and Sealed this

Twenty-third Day of October, 2001

Attest:

Attesting Officer

NICHOLAS P. GODICI
*Acting Director of the United States Patent and Trademark Office*